United States Patent
O'Connell

(10) Patent No.: US 7,313,684 B2
(45) Date of Patent: Dec. 25, 2007

(54) METHOD AND APPARATUS FOR BOOTING A COMPUTER SYSTEM

(75) Inventor: Daniel James O'Connell, Auckland (NZ)

(73) Assignee: T1 Technologies Limited, Auckland (NZ)

(*) Notice: Subject to any disclaimer, the term of this patent is extended or adjusted under 35 U.S.C. 154(b) by 316 days.

(21) Appl. No.: 10/891,149

(22) Filed: Jul. 15, 2004

(65) Prior Publication Data
US 2005/0044348 A1 Feb. 24, 2005

Related U.S. Application Data

(63) Continuation-in-part of application No. 10/266,694, filed on Oct. 9, 2002, now abandoned.

(30) Foreign Application Priority Data
Aug. 14, 2002 (NZ) .................................. 520786

(51) Int. Cl.
*G06F 15/177* (2006.01)
(52) U.S. Cl. ................ 713/2; 713/100; 714/15
(58) Field of Classification Search ............... 713/1, 713/2, 100; 714/15
See application file for complete search history.

(56) References Cited

U.S. PATENT DOCUMENTS

| 5,325,532 A | * | 6/1994 | Crosswy et al. ............. 713/2 |
| 5,504,905 A | * | 4/1996 | Cleary et al. .............. 713/100 |
| 6,173,417 B1 | | 1/2001 | Merrill |
| 6,209,088 B1 | * | 3/2001 | Reneris ..................... 713/1 |
| 6,243,809 B1 | * | 6/2001 | Gibbons et al. ............. 713/1 |
| 6,266,809 B1 | * | 7/2001 | Craig et al. ............... 717/173 |
| 6,336,161 B1 | | 1/2002 | Watts |
| 6,393,560 B1 | | 5/2002 | Merrill et al. |
| 6,434,696 B1 | | 8/2002 | Kang et al. |
| 6,438,668 B1 | * | 8/2002 | Esfahani et al. ........... 711/165 |
| 6,446,203 B1 | | 9/2002 | Aguilar et al. |
| 6,499,102 B1 | * | 12/2002 | Ewertz ..................... 713/1 |
| 6,636,963 B1 | * | 10/2003 | Stein et al. ................. 713/1 |
| 2001/0039612 A1 | | 11/2001 | Lee |
| 2002/0078338 A1 | | 6/2002 | Lay et al. |
| 2002/0169950 A1 | | 11/2002 | Esfahani et al. |

FOREIGN PATENT DOCUMENTS

| WO | WO 01/09722 | 2/2001 |
| WO | WO 01/13221 | 2/2001 |

* cited by examiner

*Primary Examiner*—Thuan Du
(74) *Attorney, Agent, or Firm*—Young & Thompson

(57) ABSTRACT

A method for quickly booting a personal computer system using a non-volatile reprogrammable memory device. A compressed memory image of the contents of the system working memory, hardware configuration and other information stored in memory when the system is in a desired operational state is stored in the non-volatile reprogrammable memory. When rebooting the process detects changed hardware and diverts from the reboot to identify the hardware before continuing.

22 Claims, 7 Drawing Sheets

NVM = Non-Volatile Memory
CMI = Compressed Memory Image
LKG = Last Known Good

NVM = Non-Volatile Memory
CMI = Compressed Memory Image
LKG = Last Known Good

CMI = Compressed Memory Image

METHOD AND APPARATUS FOR BOOTING A COMPUTER SYSTEM

CROSS REFERENCE TO RELATED APPLICATIONS

This application is a continuation-in-part of application Ser. No. 10/266,694, filed on Oct. 9, 2002 now abandoned, which claims priority to New Zealand Application 520786, filed on Aug. 14, 2002. The entire contents of each of the above-identified applications are hereby incorporated by reference.

FIELD OF THE INVENTION

This invention relates to booting a computer system or other digital processing device, and has particular relevance to desktop computer systems and personal computers including mobile computing devices.

BACKGROUND OF THE INVENTION

From a cold or hard boot the first program that a personal computer typically runs is a set of instructions loaded in Read Only Memory (ROM) or Electrically Erasable Read Only Memory (EEPROM) which contains the information required to initialise the system hardware and enable the machine to activate a hard disk drive to find the boot-strap loader.

Therefore, at present, operating systems load boot information and files from the local hard disk drive into the working or system memory, commonly called Random Access Memory (RAM). This information usually includes file system drivers, the operating system kernel, and configuration and device information that have to be parsed into useful information, and general cosmetic customisations.

Because of the sheer number and size of these files, computers often take several minutes to boot i.e. to get to a useable state, which end users often find very frustrating.

The time taken to boot a personal computer can have a significant impact on worker productivity. Personal computers are widely used in workplaces, particularly in office environments. In a large office the time spent waiting for computers to boot can result in a large quantity of unproductive time. If personnel are using mobile personal computers which are taken to meetings throughout the working day, then the problem is magnified.

Furthermore, it is not uncommon to have to re-boot a personal computer due to an operating system error that simply occurs as a result of use of the computer.

Furthermore, in some environments the continuing functionality of a computer system or other digital processing device can be very important, for example the control of a communication system or a production process. Therefore, down time resulting from a system failure or "crash" must be kept to a minimum.

The Advanced Configuration and Power Interface (ACPI) specification enables boot times to be reduced, but even systems that implement this specification usually require users to wait at least 30 seconds before they can use their computers.

To achieve this it is known to provide an "image" of the booted computer memory and to store this to hard disk or in memory as in U.S. Pat. No. 6,446,203. This patent specification still requires that the operating system be booted sufficiently to identify the area of the disk to be read, and it provides no security for the image, nor any provision for changing the image, nor any reference to storing other than the working memory.

US application 2002/0078338 stores a boot image in secondary memory, and boots from this if detected, however it has no security and is unable to detect changes in configuration.

US application 2001/0039612 provides a boot image in memory at power down but has no provision for security of the image, nor does it appear to require more than the working memory to be stored.

US application 20002/0169950 provides a boot image of the initial boot process and a compressed boot image of the middle part as well as providing a copyright check on the initial boot image, but has no other apparent security or hardware check.

WO 01/13221 uses a ROM to store a boot image, including user programs but has no apparent security, although it does store a compressed OS on disk.

U.S. Pat. No. 7,167,3417 provides a boot image stored on hard disk in compressed state, but updated for configuration changes. It has no apparent security or hardware check.

It is therefore an additional problem with a computer storing an image which boots on power up that there is held in the computer an insecure version of the booted computer memory data, possibly including data held securely elsewhere. This therefore would allow extraction of the memory image to be one means of bypassing whatever security is involved in the normal booting process.

Still further, it is possible that hardware on the computer has changed while the computer was switched off. In such cases the computer either recognises that the hardware has changed, and abandons the boot image for a full boot, or fails to recognise that changes have occurred and attempts to boot normally. Both courses will result in extended boot periods.

OBJECT OF THE INVENTION

It is an object of the present invention to provide a method and apparatus for booting a computer system which will reduce the time required for existing systems to boot, meanwhile providing a secure environment for data stored within the computer memory.

It is a further object of the present invention to provide measures which will allow changes in the configuration of the computer system but which will not cause a total abandonment of a fast boot procedure because of such changes.

These objects of the present invention will at least go some way toward overcoming disadvantages of the prior art, or will provide the public with a useful choice.

SUMMARY OF THE INVENTION

A method of booting a computer system having a system working memory to a level where the operating system is fully loaded, including the steps of providing a memory image of desired contents of the system working memory, loading the memory image in non-volatile reprogrammable memory, and upon the system being required to boot, loading the memory image from the non-volatile reprogrammable memory into the system working memory characterised in that upon reloading the memory image the loader recognizes changed hardware in the computer system incompatible with portions of the memory image, and processes initialization for this changed hardware before proceeding with unaffected portions of the memory image.

Preferably the method includes the step of encrypting and compressing the memory image and loading the encrypted compressed memory image into the non-volatile reprogrammable memory, and upon reloading, decompressing and decrypting the compressed memory image so that the decompressed memory image is loaded into the working memory.

Preferably the step of providing a memory image of desired contents of the system working memory includes the step of providing a memory image of post-boot contents of the system working memory, the contents of CPU registers and the contents of other chipset devices.

Preferably the step of providing a memory image of desired contents of the system working memory includes the step of providing a memory image which is an image of all data stored in the system working memory and other hardware device registers prior to the computer system last being shut down.

Preferably the memory image includes pages from virtual memory or the volatile page file.

Preferably it includes the step of creating the memory image during the set up process of the operating system.

Preferably it includes the step of updating the memory image in response to a significant change to the configuration of the system.

Preferably the updating step includes the step of archiving the last known good memory image.

Preferably the non-volatile reprogrammable memory is flash memory and the method includes the step of modifying the operating system source code to support a flash file system and/or a Flash Translation Layer (FTL).

Preferably it includes the step of modifying the firmware or BIOS to boot from the non-volatile reprogrammable memory.

Preferably a password is required for the firmware to boot from the memory image.

Preferably failure to supply a correct password deletes any and all stored memory images.

Preferably the memory image is an image including all system settings and memory contents relating to a logged in user.

Alternatively the invention relates to a computer system including
- a digital processing means,
- a working memory for the digital processing means,
- a non-volatile reprogrammable memory including a memory image of desired contents of the system working memory and other portions of memory, the non-volatile reprogrammable memory being capable of transferring the memory image to the system working memory in order to boot the computer system characterised in that the memory image includes hardware configuration and hardware context information.

Preferably where the computer hardware configuration has altered from that in the memory image, those portions of the image relating to changed hardware are not loaded, and the changed hardware is recognised and initialised before the remainder of the memory image is processed.

Preferably the system includes a disk drive or other memory storage device including at least one archive copy of the memory image.

Preferably the memory image is an image of desired post-boot contents of the existing working memory, the CPU registers, other chipset registers and any temporarily stored memory pages.

Preferably the memory image is an image of all data stored in the working memory prior to the computer system being shut down.

Preferably the memory image was created during a setup process of an operating system of the computer system.

Preferably the system includes a disk drive or other memory storage device including at least one "last known good" copy of the memory image.

Preferably the non-volatile reprogrammable memory uses Flash memory.

Alternatively the invention relates to a method of shutting down a computer system having a system working memory, the method including the steps of
- creating a memory image of the contents of the system working memory, the hardware configuration and context, CPU registers, chipset registers and volatile page file memory,
- loading the memory image in a non-volatile reprogrammable memory in a compressed form, and
- shutting down the computer system.

Preferably the memory image is additionally encrypted.

DETAILED DESCRIPTION

The examples referred to below relate to use of the invention to boot a personal computer and to a personal computer having a non-volatile reprogrammable memory configured to effect booting the computer. However, the invention is also applicable to other digital processing devices which require an operating system to be loaded for use, for example computer game machines, business machines and telecommunication apparatus.

Figure 1:
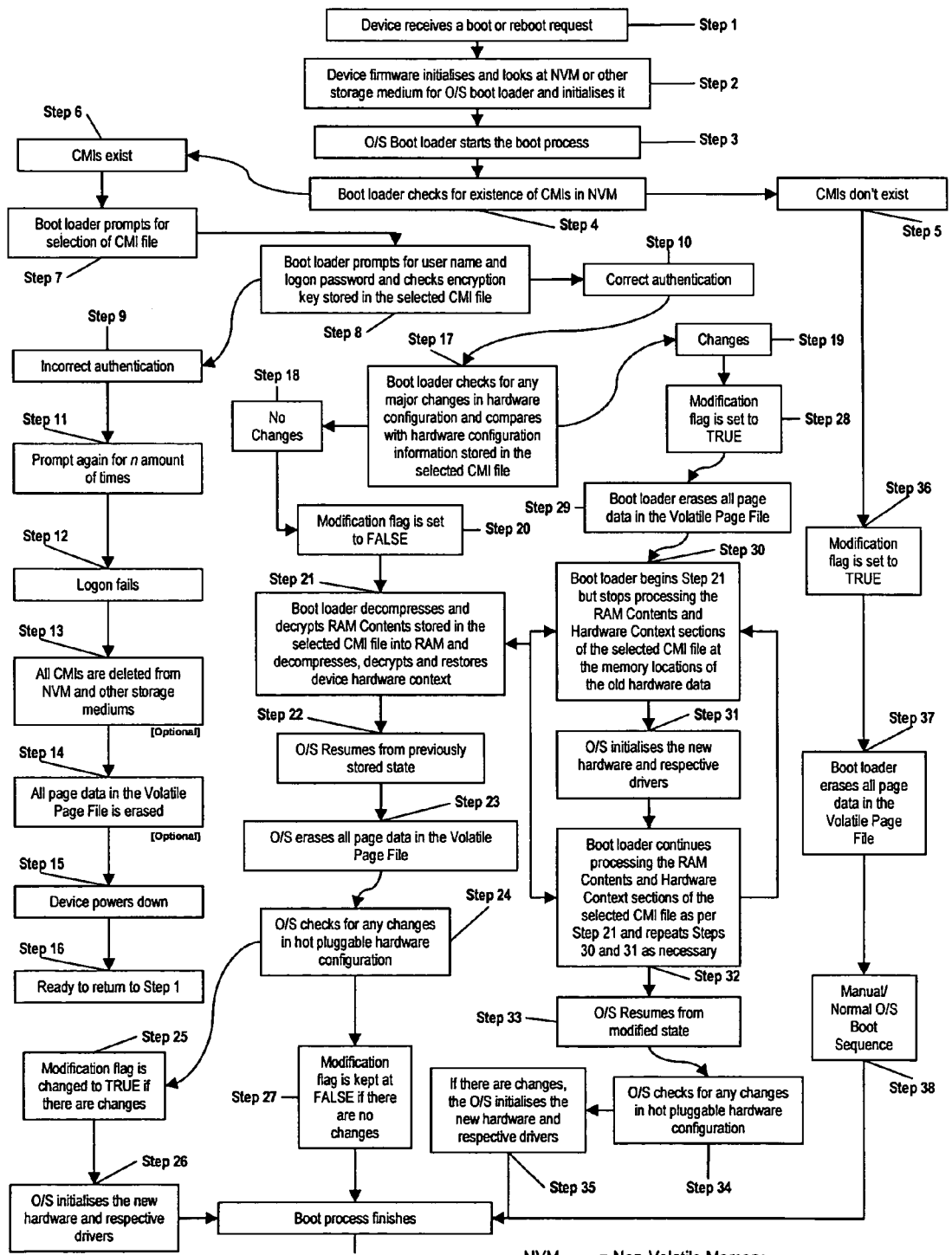
FIG. 1 is a flow diagram of a computer boot or start-up process according to the invention for an operating system driven computer

Referring to FIG. 1, a flow diagram of a boot or start up process for a computer system according to the invention is illustrated.

The method described with reference to FIG. 1 assumes that a "cold" or "hard" boot is being performed. Those skilled in the art will see that the method is also applicable to situations where a "warm" or "soft" boot is performed.

Referring to FIG. 1, a user activates the system power button for example in step 1. This applies power to the system and, in the usual way, the firmware software initiates the boot sequence. Therefore in step 2, the firmware is activated, performs its usual POST initialisation sequence, and then does one of two things. The firmware either: a) looks to the hard drive of the system for the operating system boot loader, as occurs in existing boot sequences; or (b) alternatively, the firmware looks to a non-volatile reprogrammable memory provided in the computer system. Even if the firmware initially looks to the hard drive for the operating system boot loader, the boot loader still directs the system to download a memory image from the non-volatile reprogrammable memory, as will be described further below, though this may be conditional on the user entering a password stored in firmware.

The non-volatile reprogrammable memory is provided as an integrated circuit, which is accessible to the computer system, for example being provided on the motherboard of the personal computer. Alternatively, it is provided as a PCI add-in card to retrofit to an existing machine. The non-volatile reprogrammable memory may also be provided in other ways, so long as it satisfies requirements of being accessible to the system to enable its contents to be accessed sufficiently quickly by the system to make the boot method of the present invention worthwhile.

Turning now to step 3, the operating system boot loader therefore starts the boot process either directly from the contents of the non-volatile reprogrammable memory, or from the hard drive of the system.

The non-volatile reprogrammable memory contains a memory image of the contents of RAM which are sufficient, when loaded into system memory, to enable the computer system to be provided in a useable state for a user i.e. to boot the computer system.

Depending upon the requirements of the user, the memory image that is captured and provided in the non-volatile reprogrammable memory may take a variety of forms. For example, the non-volatile reprogrammable memory may contain a memory image of the post-boot system working memory (i.e. RAM) contents.

Another alternative, for example, is to load the non-volatile reprogrammable memory with a preferably compressed memory image of all data currently stored in RAM. In a preferred form, this compressed memory image is stored from a previous shutdown procedure similar to a State S4 shutdown procedure in the current ACPI 2.0a specifications. This includes computer and/or operating system settings of the computer system where it is in a state ready for use by a user, and is preferably provided to a user for a user to resume use of the system where it is in a condition which is the same or substantially the same as it was when the user commenced shutdown.

Details of a standard ACPI S4 shutdown can be found from the current ACPI specification, Revision 2.0, which is available at url http://www.acpi.info.

The memory image may also be only a partial image of the system memory. Therefore, the image may comprise data relating to the bulk of the operating system for example, and the remainder of the information necessary to build or establish the system working memory may be loaded into the working memory from another memory storage device such as the system hard disk. This arrangement may be preferable where the size of the non-volatile reprogrammable memory needs to be limited, for example due to cost constraints, but the invention is still worthwhile because the overall time taken to perform a boot process is still significantly reduced as compared to known boot processes.

The memory image may be initially created during the set up process of the operating system, or may alternatively be replaced whenever a user makes a significant change to the configuration of the computer. Also, the memory image may be captured every time the user initiates a shut down sequence. These options are discussed further with reference to FIG. 2.

The memory image is preferably compressed, so that a compressed memory image (CMI) is stored in the non-volatile reprogrammable memory and retrieved from the non-volatile reprogrammable memory when required. Compression can save a significant amount of memory space without the decompression process adding significantly to the reduced boot time provided by the present invention. A compression algorithm such as that available in the open source zlib library may be used.

In addition to compression the memory image may also be encrypted to the same standard as the hard drive to prevent attempts to recover information from the memory where the hard drive carrying the same data is secured.

In FIG. 1, where it has been determined that a compressed memory image exists (step 6), the user is required to choose (step 7) among CMI files if there are multiple files (as, for instance, for multiple users or different operating systems) and is prompted for a password (step 8). If an incorrect password is supplied (step 9) the logon attempt may be retried (step 11) but if it eventually fails (step 12) the computer deletes the compressed memory image (step 13) and any data in the volatile page file (the temporary storage on the hard disk) and shuts down (step 15). These precautions render it difficult to break the fast boot system. If the CMI is deleted the next boot will be a normal boot sequence (steps 4-5, 36-39).

When a password is supplied and correct the boot loader checks for any major changes in hardware from that of the compressed memory image (step 17). If there are none the CMI located in the non-volatile reprogrammable memory is decompressed, and the computer system settings and full memory contents are loaded into RAM from the decompressed CMI (step 21), thus providing all the applications, services and device drivers.

The operating system then takes over from the previously stored state, clears the volatile page file (step 23) and checks for any changes in the hot pluggable hardware configuration. If it finds any it will set the modification flag to FALSE (step 25) so that on close down a new image will be made.

The quicker boot process is now completed.

If a changed hardware configuration is found at the hardware check (step 17) the boot loader clears all temporary data but processes the memory image to the point where the hardware change needs servicing (step 30). Any changed device drivers are then loaded (step 31) and the memory image decompression and loading is then resumed, jumping over the inapplicable portion (step 32). The OS is thus instantiated and the PC boots fully, as previously, however the modification flag will be set so that a new memory image will be saved at shut down.

Because the memory contents are loaded very quickly from the non-volatile reprogrammable memory into RAM, rather than being searched for and transferred from the system hard disk, the time required for the boot process is dramatically reduced.

In one example of booting a personal computer (PC) using the Microsoft Windows™ operating system, the firmware checks the non-volatile reprogrammable memory for boot information first, and loads the windows boot files and kernel into memory. The registry hives may be created and stored in non-volatile reprogrammable memory if storage space permits, or they may be created and stored on the local hard drive, as is the case with existing systems. While Windows is loading, device drivers will be loaded into RAM from non-volatile reprogrammable memory. Services and third party start-up applications will be pre-loaded from the local hard drive. A typical personal computer may be physically modified to implement this process by providing 64 megabyte or upwards of non-volatile reprogrammable memory chip(s) added to the motherboard of the machine. The firmware on the PC is modified to allow booting from the non-volatile reprogrammable memory using built in support for a flash file system (FFS) and Flash Translation Layer (FTL). Microsoft Windows™, for example Windows XP, may be modified to support the FFS/FTL through internal drivers (e.g. FAT16/32, NTFS, and FFS/FTL) or third party drivers. Hardware support can be provided through an add-on PCI based product. Windows boot files and device drivers are added to the non-volatile reprogrammable memory, and third party start up programs are physically moved to the start of the hard drive.

In another example using a Windows operating system, the firmware boots from non-volatile reprogrammable memory, and loads and decompresses the memory image into RAM. Minor environmental changes are loaded or created from the beginning of the hard drive after the memory image is in RAM. These include (but are not limited to) the following:

Application installations
Non-critical start-up applications
Registry hives
Page file (virtual memory).

Physical modifications to a typical personal computer running Microsoft Windows operating system are similar to those referred to in the example above, however a user customised compressed Windows memory image is created during Windows setup, and is stored in non-volatile reprogrammable memory. Further customised settings are stored at the beginning of the hard drive.

Figure 2:
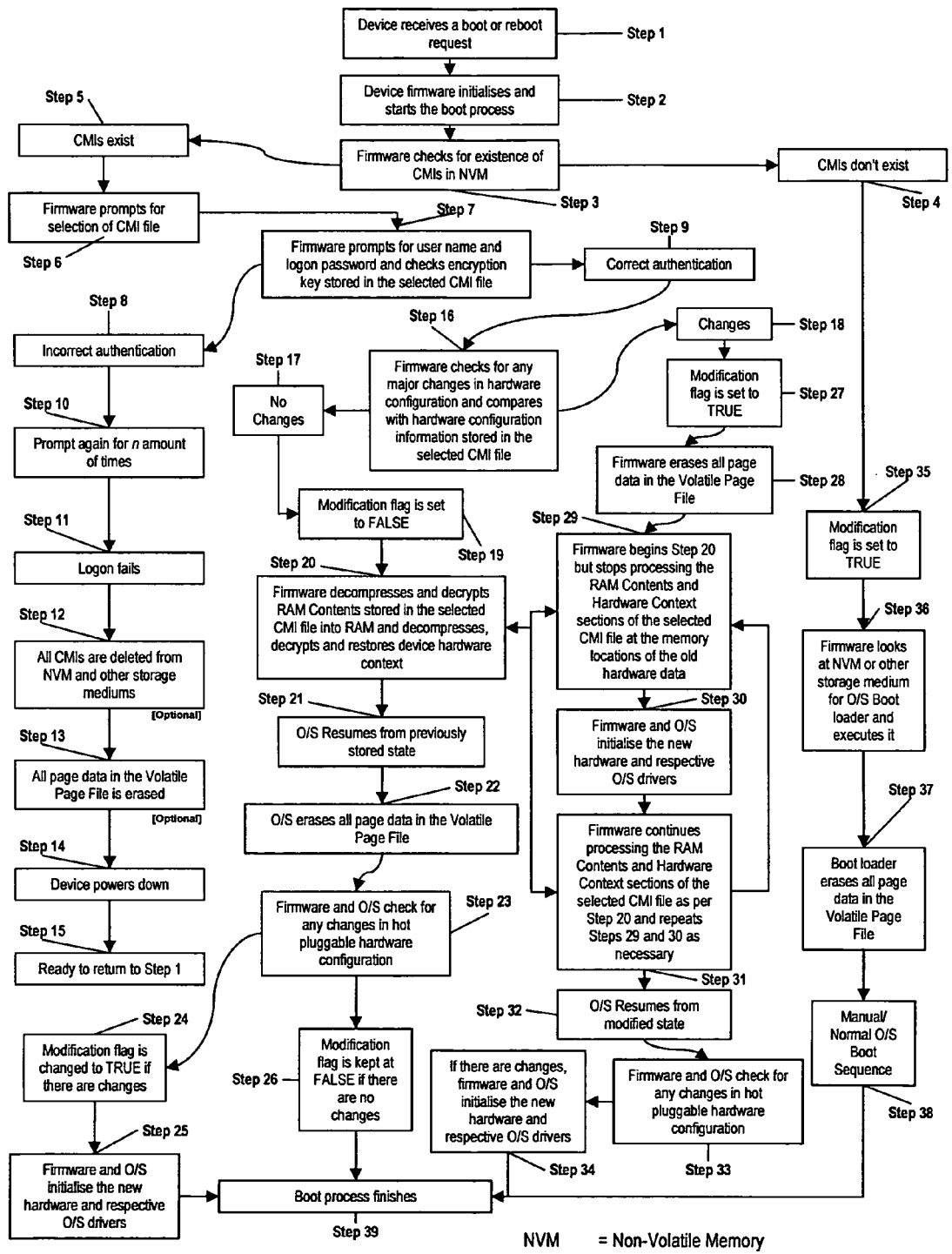
FIG. 2 is a flow diagram of a computer boot or start-up process according to the invention for a firmware driven computer

FIG. 2 shows an alternative sequence for those computers which use a firmware which checks for component changes. This sequence differs from that of FIG. 1 only in that the ZBIOS performs the hardware configuration checks rather than using an operating system which provides the checks.

Figure 3:
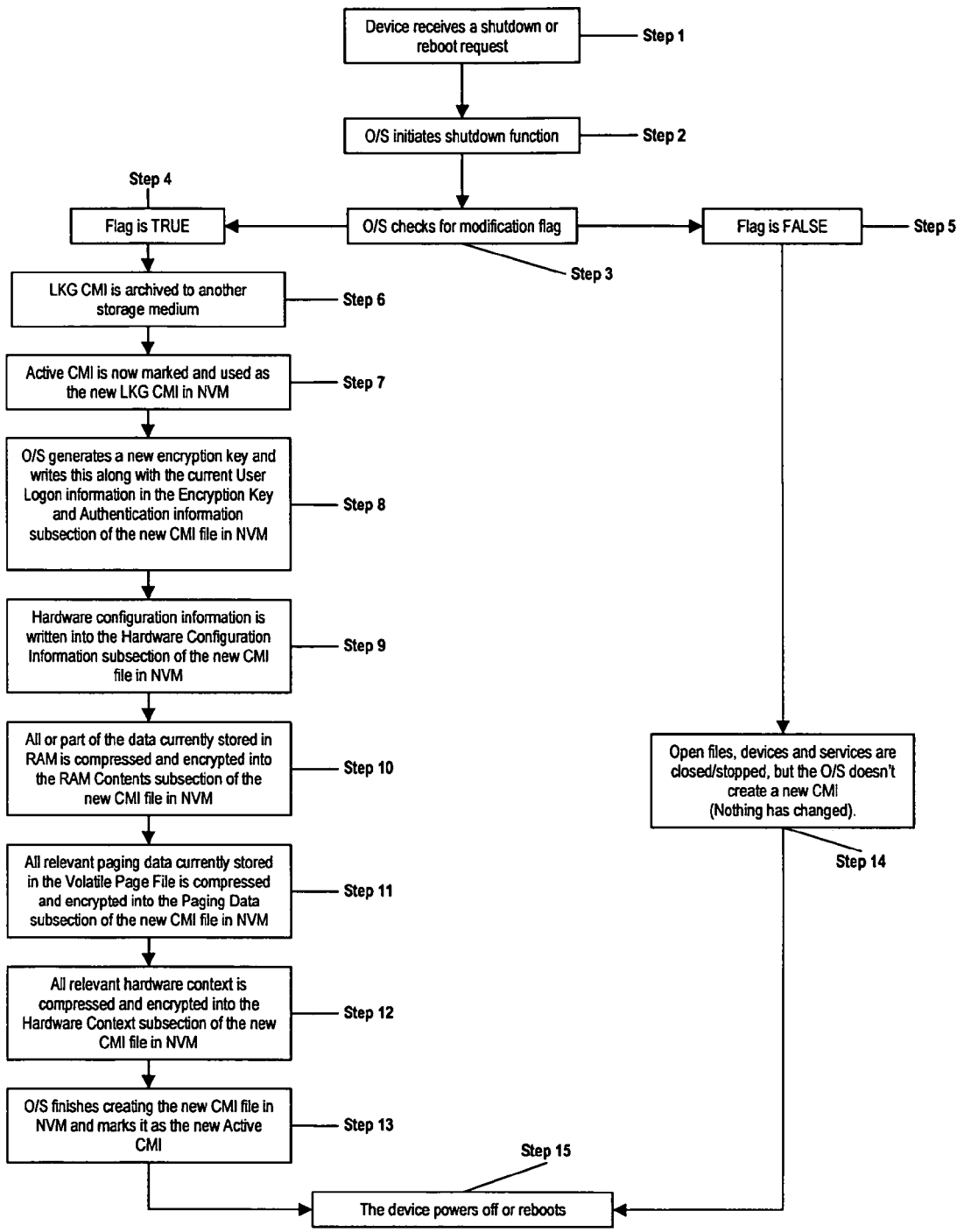
FIG. 3 is a flow diagram of a shutdown process according to the invention

Turning now to FIG. 3, a shut down process for a computer system according to the invention is diagrammatically illustrated. The process begins in step 1 with the user selecting a shut down command from the operating system. The operating system, as part of the shut down process, then checks for a modification flag in step 3. The modification flag is one that is set by the operating system whenever a significant change is made to the configuration of the computer. A significant change may include (without limitation) the following:

a) new application installations
   i) application installations that require components to load once the operating system boots.
b) changes to registry hives
c) device driver upgrades
d) service pack/hotfix installations
e) service modifications
f) user environment customisations
   (i) desktop
   (ii) wallpaper
   (iii) themes
   (iv) sounds
   (v) icons
   (vi) colour schemes.

Therefore, with each new user session from a boot up the modification flag is set to false. Then, when a significant change occurs, such as changes listed above for example, then the flag is set to true. For purposes of clarity, the list of significant changes provided above is not exhaustive. Furthermore, a user may wish to exclude some of the actions from the list provided above.

Returning to FIG. 3, if the modification flag is false as shown in step 5, then the operating system closes all open files, devices and services but does not save any system configuration data, since nothing in that area has changed, as shown in step 14. The operating system then continues its normal shut down process, currently implemented in the ACPI 2.0a specifications as a State S5 Shutdown, in step 15. The computer is then in a state where it either switches itself off or reboots.

If the modification flag is true as shown by step 4 in FIG. 3, then the "last known good" (LKG) compressed memory image is archived to an appropriate storage means such as the system's local hard drive. This occurs in step 6.

Then, in step 7, the CMI that was used to last boot the system, being the active CMI, is now used as the LKG CMI.

The operating system then initiates a modified shut down procedure, beginning with step 8.

In step 8 a new encryption key is generated and stored in a new CMI. Subsequent to this at step 9 the current hardware information is written to the new file and then at step 10 all data currently stored in RAM is compressed and encrypted using an appropriate compression algorithm and stored. Next, any paging data in the volatile page file is loaded into the Paging Data subsection of the new CMI file at step 11 and then the current hardware context is loaded at step 12. The loading process then completes and the final file in non-volatile RAM is marked as the new Active CMI at step 13. The operating system then finishes the modified shut down process as described above with reference to step 15.

From the method shown in FIG. 3 it can be seen that an archive of compressed memory images which may be used to boot the system is retained. In this way, if a user makes a significant change which is deleterious to the operation of the machine i.e. is undesirable, or if the system crashes, a user will always have at least one compressed memory image from which the machine may be rebooted.

Figure 4:
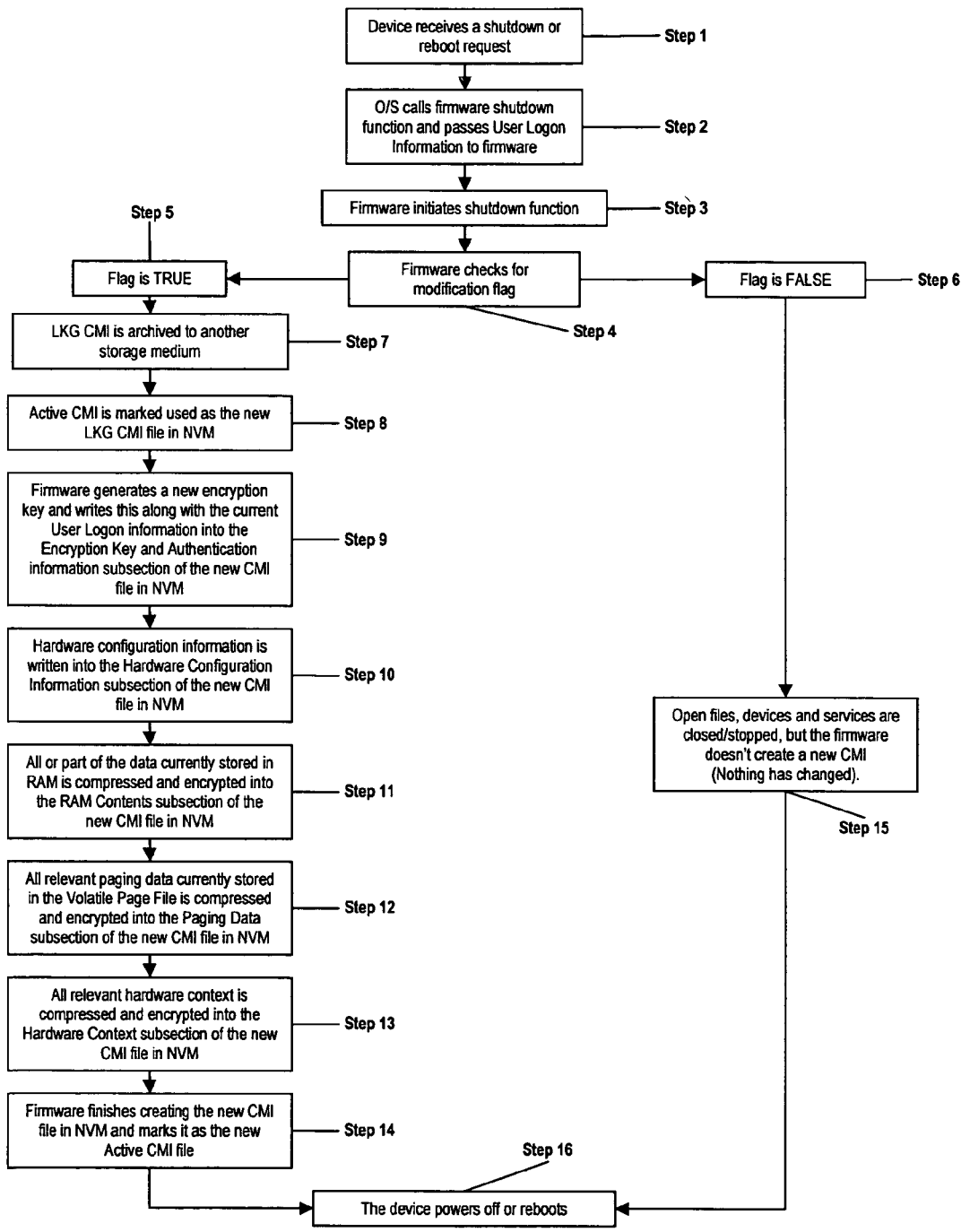
FIG. 4 is a flow diagram of a shutdown process for a firmware driven computer according to the invention.

FIG. 4 shows a similar shutdown sequence, but this time for a firmware controlled computer, where the initial and final parts of the modified shutdown procedure are under firmware control.

Figure 5:
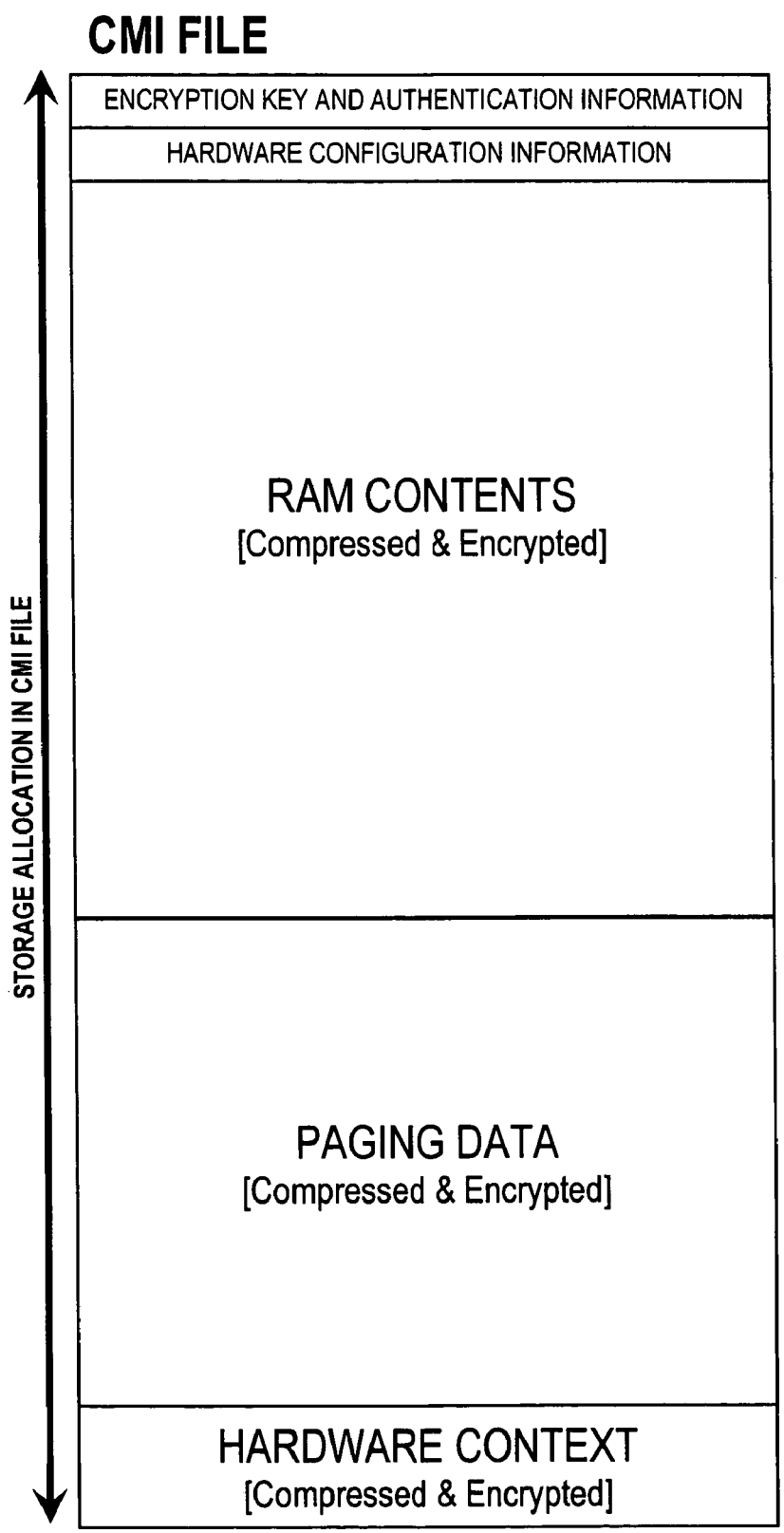
FIG. 5 is a diagram of the contents of a compressed memory image file
Figure 6:
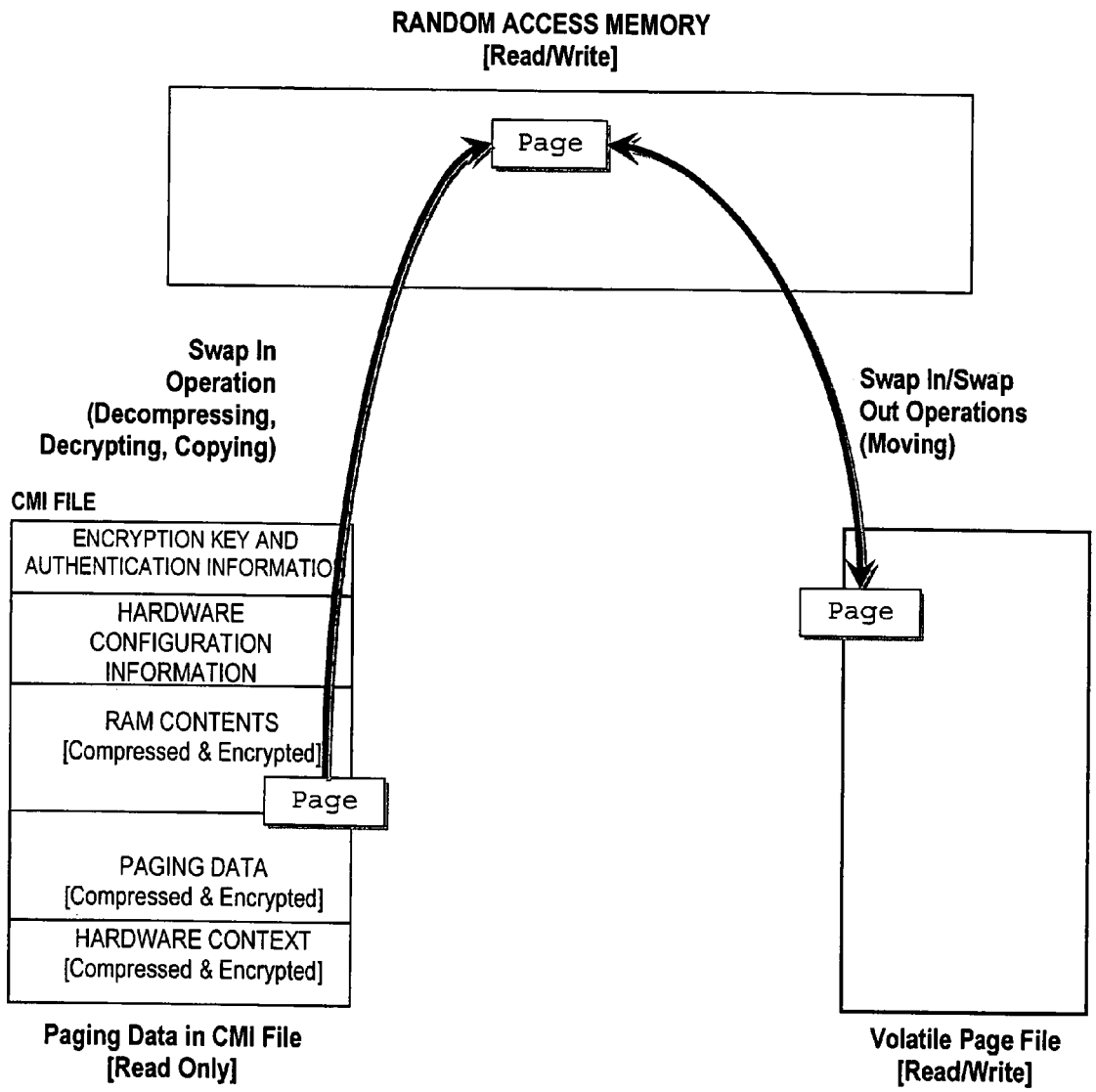
FIG. 6 is a flow diagram of the swap operations involved in paging data between the various memory or virtual memory locations.

FIG. 5 shows the layout of a typical compressed memory image (CMI) file, where the encryption key and authentication information are stored first, followed by the hardware configuration information, then the RAM contents, the paging data from the virtual memory file (or volatile page contents) and finally the hardware context of the current hardware. The reloading of the compressed and encrypted information is sufficient to return the computer to a fill working state if no changes have been made to its configuration since last shutdown.

Figure 7:
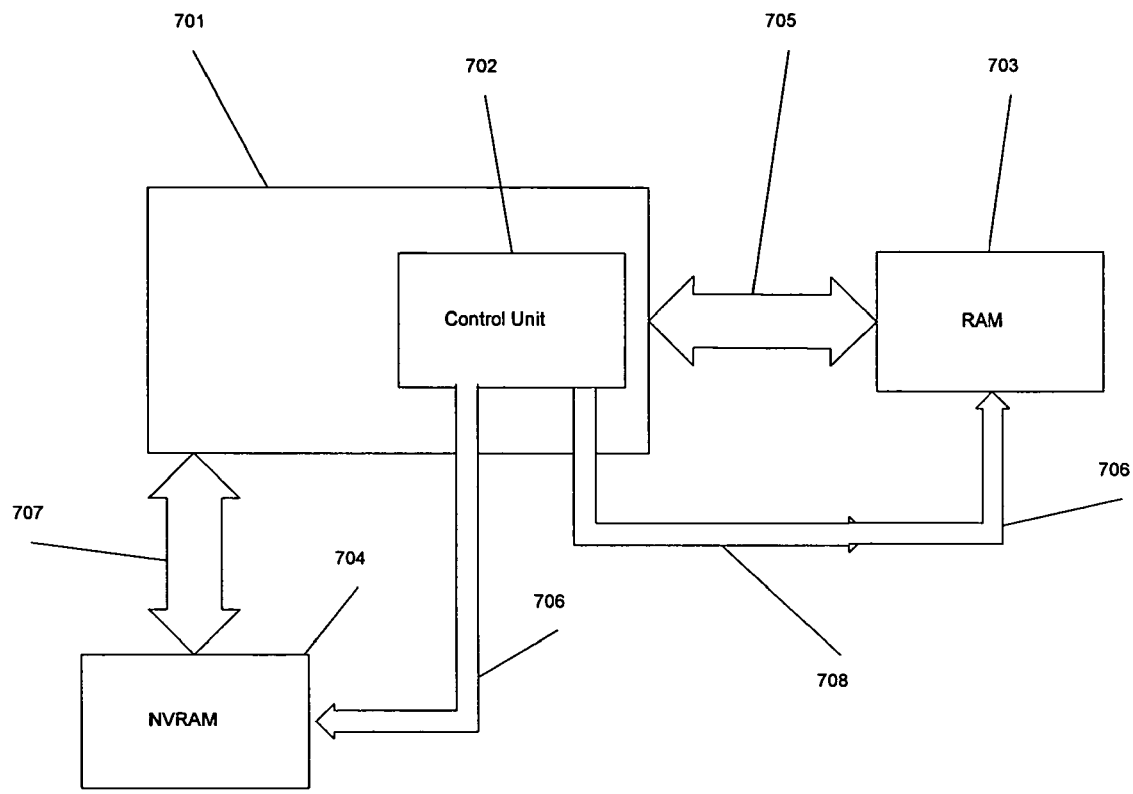
FIG. 7 is a diagram of the data flow within the computer

FIG. 7 shows the three operations relating to the storage of the paging files (volatile page file or virtual memory file) where these may have been stored in the compressed memory image. The first time the system requests a page (Step 1) which should be in the volatile page file it is retrieved from the CMI paging data, decompressed and decrypted before being exported to RAM as at step 2. If the page ages out in RAM, because pages with a higher priority must be stored, it will be swapped out to the volatile page file as at steps 3 and 4. Subsequently, as in normal operation, where the system again requests that memory page it will be swapped in from the volatile page file as shown by steps 5 and 6.

Turning now to FIG. 7, the basic processor and memory components of an example of a computer system according to the present invention are shown. To those skilled in the art to which the invention relates, other arrangements and communication paths for the memory devices are possible. The system has a central processing unit (CPU) 701 within which is provided a control unit 702. Working memory in the form of random access memory (RAM) 403 is provided, as is non-volatile reprogrammable memory 704. A data bus 705 allows data to be interchanged between RAM 703 and the CPU 701 under control of the control unit 702 via address data control bus 706. Similarly, a data bus 707 allows data to be interchanged between the non-volatile reprogrammable memory 703 and the CPU under control of the control unit 402 via address data control bus 708. Therefore, bus 707 allows information in RAM comprising the entire memory content to be transferred to non-volatile reprogrammable memory 704. Buses 705 and 707 may comprise a system bus. Furthermore, the content of RAM 703 may have been subject to compression whereby the compressed image may be transferred via bus 707 to be stored in non-volatile reprogrammable memory 704. Then, when required, the memory image stored in non-volatile reprogrammable memory 704 may be transferred directly to RAM 703, or may firstly be compressed and then installed in RAM 703.

The non-volatile reprogrammable memory 704 has the advantage that it is essentially a solid state device which is non-volatile so the contents of the non-volatile reprogrammable memory are retained when the power supply is removed from the computer system. However, those skilled in the art will appreciate that references in this document to non-volatile reprogrammable memory include the use of flash RAM i.e. the forms of non-volatile reprogrammable memory which require a source of external power such as a battery for example in order to maintain the memory content.

A non-volatile reprogrammable memory device according to the invention may be provided as an integrated circuit on the system motherboard for example, or on a separate board or card. In particular, if desired, non-volatile reprogrammable memory may be provided on a card such as those referred to under the trade marks SmartMedia or Compact-Flash.

Some non-volatile reprogrammable memory products that are currently available have load times orders of magnitude faster than hard drives, so it will be seen that the method and system according to the present invention provides significant advantages in terms of boot times compared with prior art systems.

Other types of non-volatile memory and Solid State Disks may be used with or instead of Flash Memory, such as Magnetic RAM (MRAM) which boasts transfer speeds exponentially faster in both read and write operations than Flash Memory. MRAM is expected to be mass produced in 2005.

Preferably the set-up application for the desired operating system additionally creates a Compressed Memory Image (CMI), containing a compressed image of all data currently stored in RAM, such as is currently implemented in the ACPI 2.0a specifications (currently available from http://www.acpi.info) as a State S4 system context file. This file is stored in the non-volatile reprogrammable memory, but the set-up application does not shut the computer down as is the case for a State S4 system context file creation in the current ACPI 2.0a specifications, rather it follows a programmed shut down procedure.

Preferably the operating system source code is modified to internally support a flash file system (FFS) through a Flash Translation Layer (FTL), such as Intel's own FTL specification (http://www.intel.com/design/flcomp/ap-plnots/297816.htm).

Conveniently the compressed memory image (CMI) has the compressed version of all data currently stored in RAM resulting from a previous shut down procedure, similar to a State S4 shutdown procedure in the current ACPI 2.0a specifications.

In the most preferred embodiment the previous CMI is archived to installed and non-volatile reprogrammable memory to be used as a "last known good" CMI.

References in this document to computer systems include digital data processing systems generally.

Throughout the description and claims of this specification the word "comprise" and variations of that word, such as "comprises" and "comprising", are not intended to exclude other additives, components, integers or steps.

INDUSTRIAL APPLICABILITY

The invention provides a method of allowing a computer to boot up considerably more quickly than a standard hard disk boot even if the computer configuration has changed since the last good boot, thereby providing a reduced level of expenditure on user time wasted waiting for a computer to load software to the point at which a user can carry out useful work on it. Additionally it provides for doing this in a secure manner.

The invention claimed is:

1. A method of booting a computer system having at least one central processing unit, a loadable operating system, and a system working memory configured to receive a working operating system to a level where the loadable operating system is fully loaded, the method comprising the steps of:
   providing a memory image of desired contents of the system working memory,
   storing the memory image in non-volatile reprogrammable memory, and
   upon the system being required to boot, loading the memory image from the non-volatile reprogrammable memory into the system working memory using a loader, during the loading the loader (i) recognizing changed hardware in the computer system incompatible with portions of the memory image relating to changed hardware, (ii) processing initialization for the changed hardware, and (iii) proceeding to load remaining unaffected portions of the memory image to boot the computer system to an operable state.

2. A method as claimed in claim 1 the steps of (i) encrypting and compressing the memory image before storing the memory image into the non-volatile reprogrammable memory, and (ii) decompressing and decrypting the memory image prior to the step of loading the memory image from the non-volatile reprogrammable memory into the system working memory.

3. A method as claimed in claim 1 wherein the step of providing a memory image of desired contents of the system working memory includes the step of providing a memory image of post-boot contents of the system working memory, the contents of CPU registers and the contents of other chipset devices.

4. A method of booting a computer system as claimed in claim 1 wherein the memory image is an image of all data stored in the system working memory and other hardware device registers prior to the computer system last being shutdown.

5. A method of booting a computer system as claimed in claim 4 wherein the memory image includes pages from virtual memory or the volatile page file.

6. A method as claimed in claim 1 further comprising the step of creating the memory image during the set up process of the operating system.

7. A method as claimed in claim 1 further comprising the step of updating the memory image stored in the non-volatile reprogrammable memory after recognizing changed hardware in the computer system.

8. A method as claimed in claim 7 further comprising the step of archiving a last known good memory image in the non-volatile reprogrammable memory.

9. A method as claimed in claim 7 wherein, at system shutdown, the memory image stored in non-volatile reprogrammable memory is not updated.

10. A method as claimed in claim 1 wherein the non-volatile reprogrammable memory is flash memory and the method further comprises the step of modifying the operating system to support a flash file system and/or a Flash Translation Layer (FTL).

11. A method as claimed in claim 1 further comprising the step of modifying the firmware to boot from the non-volatile reprogrammable memory.

12. A method as claimed in claim 11 further comprising the step of requiring a password for the firmware to boot from the memory image.

13. A method as claimed in claim 12 wherein failure to supply a correct password deletes any and all stored memory images.

14. A method as claimed in claim 1 wherein the memory image is an image including all system settings and memory contents relating to a logged in user.

15. A computer system, comprising:
   a digital processing means,
   a working memory for the digital processing means,
   a non-volatile reprogrammable memory including a memory image of desired contents of the system working memory and other portions of memory, wherein the memory image includes system hardware configuration and system hardware context information and wherein the memory image is transferable to the system working memory in order to boot the computer system, and
   a loader configured to, upon system boot, (i) transfer the memory image from the non-volatile reprogrammable memory into the system working memory, (ii) during the transfer into the working memory, recognize changed hardware in the computer system that is incompatible with portions of the memory image related to changed hardware so as not to load said portions, (iii) process initialization for the changed hardware, and (iv) load remaining portions of the memory image to boot the computer system to an operable state.

16. A computer system as claimed in claim 15 wherein the system includes a disk drive or other memory storage device including at least one archive copy of the memory image.

17. A computer system as claimed in claim 15 wherein the memory image is an image of desired post-boot contents of the existing working memory, the CPU registers, other chipset registers and any temporarily stored memory pages.

18. A computer system as claimed in claim 15 wherein the memory image is an image of all data stored in the working memory prior to the computer system being shut down.

19. A computer system as claimed in claim 15 wherein the memory image was created during a setup process of an operating system of the computer system.

20. A computer system as claimed in claim 15 wherein the system includes a disk drive or other memory storage device including at least one "last known good" copy of the memory image.

21. A computer system as claimed in claim 15 wherein the non-volatile reprogrammable memory uses flash memory.

22. A method of booting a computer system having a loadable operating system and a system working memory configured to receive a working operating system, the method comprising the step of:
   loading a memory image from non-volatile reprogrammable memory into the system memory, the memory image having been stored into the non-volatile reprogrammable memory before the loading,
   wherein the stored memory image comprises contents of the system working memory including a working operating system, and
   wherein during loading
   (i) recognizing a hardware item changed since the memory image was stored,
   (ii) identifying a portion of the memory image incompatible with the changed hardware item as not to be loaded,
   (iii) initializing the changed hardware item, and
   (iv) loading a remainder of the memory image that is not incompatible with the changed hardware item.

* * * * *